(12) United States Patent
Johri et al.

(10) Patent No.: US 10,160,440 B2
(45) Date of Patent: Dec. 25, 2018

(54) METHODS AND SYSTEM FOR CONTROLLING DRIVELINE TORQUE

(71) Applicant: Ford Global Technologies, LLC, Dearborn, MI (US)

(72) Inventors: Rajit Johri, Canton, MI (US); Fazal Urrahman Syed, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 15/184,613

(22) Filed: Jun. 16, 2016

(65) Prior Publication Data

US 2017/0361831 A1 Dec. 21, 2017

(51) Int. Cl.
*B60W 20/13* (2016.01)
*B60W 20/15* (2016.01)
(Continued)

(52) U.S. Cl.
CPC ............ *B60W 20/13* (2016.01); *B60K 6/387* (2013.01); *B60K 6/48* (2013.01); *B60W 10/023* (2013.01); *B60W 10/026* (2013.01); *B60W 10/06* (2013.01); *B60W 10/08* (2013.01); *B60W 20/15* (2016.01); *B60W 20/50* (2013.01); *B60W 30/18109* (2013.01); *B60W 30/18127* (2013.01); *B60W 30/18136* (2013.01); *B60W 50/029* (2013.01); *F16H 61/143* (2013.01); *F16H 63/46* (2013.01); *B60K 2006/4825* (2013.01); *B60W 2050/0297* (2013.01); *B60W 2510/087* (2013.01); *B60W 2510/1005* (2013.01); *B60W 2510/107* (2013.01); *B60W 2510/244* (2013.01); *B60W 2510/246* (2013.01); *B60W 2540/10* (2013.01); *B60W 2710/024* (2013.01); *B60W 2710/0627* (2013.01); *B60W 2710/0666* (2013.01); *B60W 2710/083* (2013.01);
(Continued)

(58) Field of Classification Search
CPC ............ Y10T 477/26; Y10T 477/6351; B60W 20/13; B60W 30/18136; B60W 30/18127; B60W 10/026; B60W 10/06; B60W 10/08; B60W 2710/083; B60W 2510/1005; B60W 2510/087; B60W 2510/244; B60W 2540/10; B60W 2710/024; B60W 2710/0666; B60K 2006/4825; B60Y 2200/92; B60Y 2300/202; B60Y 2300/421; F16H 2061/147
See application file for complete search history.

(56) References Cited

U.S. PATENT DOCUMENTS

| | | | | |
|---|---|---|---|---|
| 5,713,814 A * | 2/1998 | Hara | ...................... | B60K 6/365 180/65.25 |
| 5,788,597 A * | 8/1998 | Boll | ........................ | B60K 6/46 180/165 |
| 6,183,389 B1 * | 2/2001 | Tabata | ................... | B60K 6/365 477/174 |
| 6,705,686 B2 * | 3/2004 | Hilbert | .................. | B60K 6/365 180/65.26 |

(Continued)

*Primary Examiner* — Roger L Pang
(74) *Attorney, Agent, or Firm* — David Kelley; McCoy Russell LLP (57) ABSTRACT

Systems and methods for operating a hybrid powertrain that includes an engine and a motor/generator are described. The systems and methods adjust torque converter clutch opening responsive to whether or not a motor/generator is available to provide a negative torque to a driveline. Further, the motor/generator and the vehicle's engine are operated to provide a desired amount of driveline braking.

9 Claims, 5 Drawing Sheets

(51) Int. Cl.
*B60K 6/387* (2007.10)
*B60W 10/02* (2006.01)
*B60W 10/06* (2006.01)
*B60W 10/08* (2006.01)
*F16H 61/14* (2006.01)
*F16H 63/46* (2006.01)
*B60W 50/029* (2012.01)
*B60K 6/48* (2007.10)
*B60W 30/18* (2012.01)
*B60W 20/50* (2016.01)

(52) U.S. Cl.
CPC ..... *B60Y 2200/92* (2013.01); *B60Y 2300/202* (2013.01); *B60Y 2300/421* (2013.01); *F16H 2061/147* (2013.01); *Y10S 903/914* (2013.01); *Y10S 903/946* (2013.01); *Y10T 477/26* (2015.01); *Y10T 477/6351* (2015.01)

(56) References Cited

U.S. PATENT DOCUMENTS

| | | | |
|---|---|---|---|
| 7,673,714 B2 | 3/2010 | Soliman et al. | |
| 8,491,442 B2* | 7/2013 | Saito | B60K 6/48 477/174 |
| 8,818,592 B2* | 8/2014 | Dessirier | B60L 11/005 701/22 |
| 8,892,290 B2* | 11/2014 | Reed | B60W 10/196 180/65.1 |
| 9,026,296 B1* | 5/2015 | Johri | B60W 20/10 701/22 |
| 2002/0179047 A1 | 12/2002 | Hoang et al. | |
| 2014/0038772 A1* | 2/2014 | Dai | B60W 20/106 477/3 |
| 2015/0329103 A1 | 11/2015 | Kim et al. | |
| 2017/0253235 A1* | 9/2017 | Adam | B60W 20/50 |

* cited by examiner

METHODS AND SYSTEM FOR CONTROLLING DRIVELINE TORQUE

FIELD

The present description relates to methods and a system for operating a powertrain of a hybrid vehicle. The methods and systems may be particularly useful for hybrid vehicles that provide wheel torque via an engine and motor positioned along a shaft providing input to a transmission.

BACKGROUND AND SUMMARY

It may be desirable for a vehicle to decelerate at a predetermined rate during select vehicle operating conditions. For example, if a driver fully releases an accelerator pedal, it may be desirable for the vehicle to decelerate at a predetermined rate until the vehicle reaches a creep speed. The vehicle braking may be provided via an engine providing a negative torque to the vehicle driveline. The negative driveline torque is applied to the vehicle's wheels to decelerate the vehicle. One way to apply a negative torque to the driveline via the engine is to enter a deceleration fuel shut off mode (DFSO) or deceleration fuel cut off mode. In DFSO mode, fuel supplied to one or more engine cylinders ceases or is shut off so that combustion ceases in cylinders with fuel shut off, thereby deactivating the cylinders. Deactivated cylinders may induct air from the engine's intake manifold and expel the air to the engine's exhaust system without the air participating in combustion. Pumping air through the engine provides a negative torque to the driveline via the engine and it converts the vehicle's kinetic energy into heat and torque to keep the engine spinning. However, the vehicle's kinetic energy is not recoverable or reusable when it is transformed into heat and torque to rotate the engine.

The inventors herein have recognized the above-mentioned issues and have developed a powertrain operating method, comprising: providing a negative input torque to a transmission via a motor in response to the motor being available to supply the negative input torque and driver demand torque less than a threshold; and providing the negative input torque to the transmission via an engine operating in a deceleration fuel cut off mode in response to the motor being unavailable to supply the negative input torque and the driver demand torque less than the threshold.

By providing negative driveline torque via a motor when the motor is available to provide the negative driveline torque, a vehicle's kinetic energy can be stored as electrical energy to conserve power. However, during conditions where the motor is not available to convert the vehicle's kinetic energy to electrical energy, the vehicle's engine may provide the requested driveline braking so that the vehicle may decelerate at a desired rate. Further, a torque converter clutch unlocking schedule based on whether or not the motor is available to provide a negative torque to the driveline schedules torque converter unlocking according to a first torque converter clutch unlocking schedule when the motor is available to provide a desired braking torque to the driveline. Torque converter unlocking is scheduled according to a second torque converter clutch unlocking schedule when the motor is not available to provide a desired braking torque to the driveline.

The present description may provide several advantages. For example, the approach may improve utilization of a vehicle's kinetic energy. Further, the approach may reduce driveline torque disturbances. In addition, the approach may provide improved torque converter clutch control.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
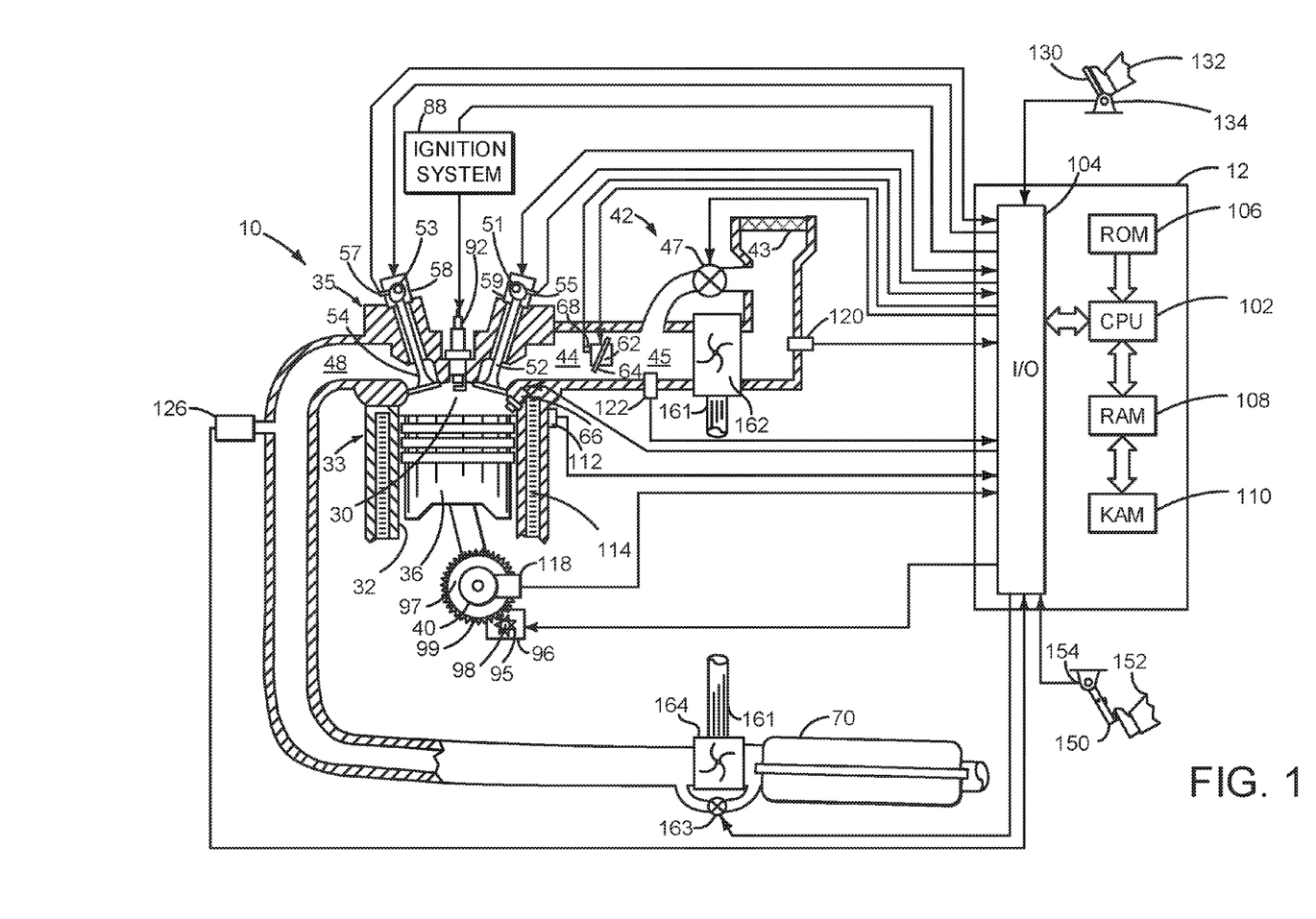
FIG. 1 is a schematic diagram of an engine.
Figure 2:
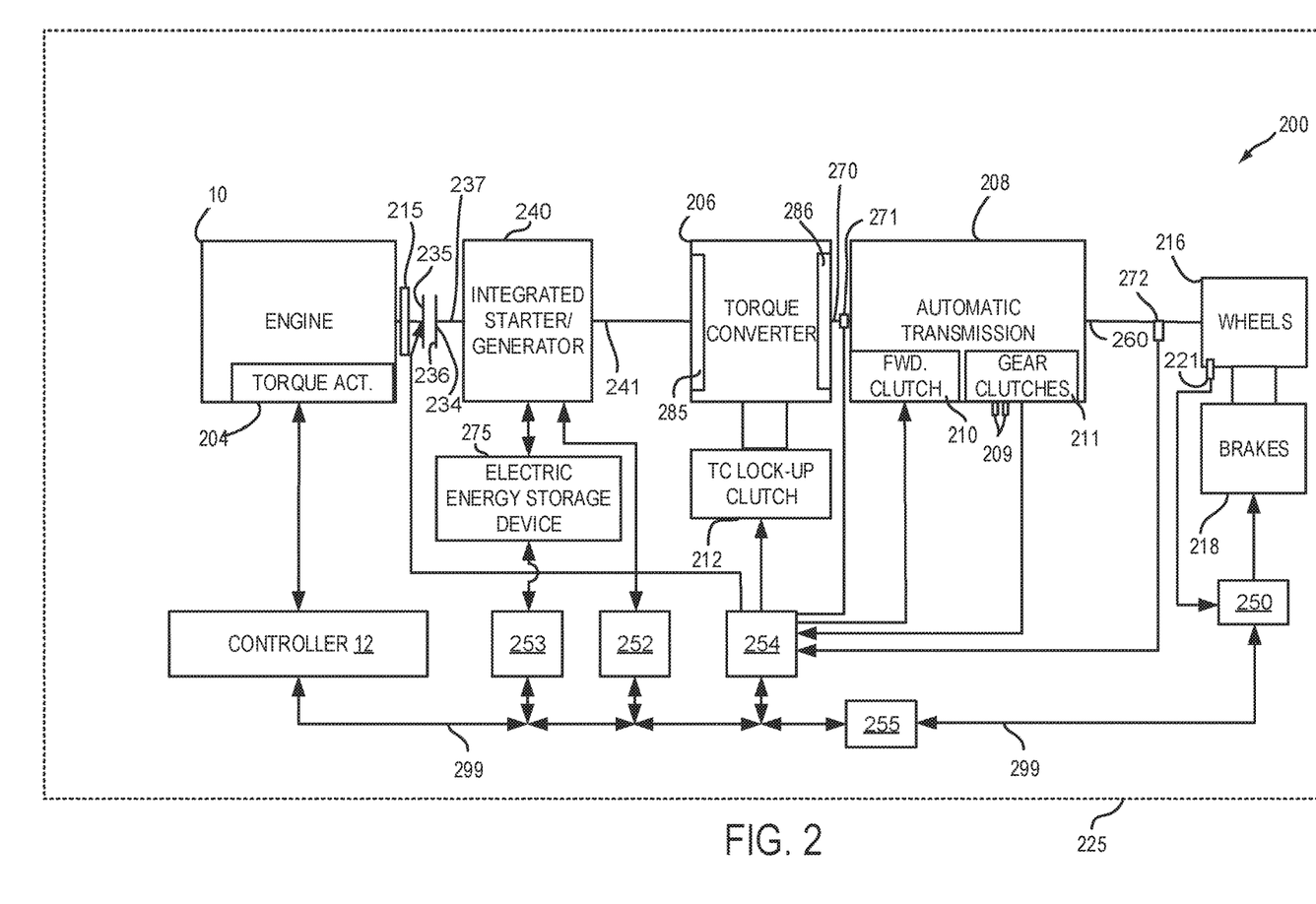
FIG. 2 is a schematic diagram of a hybrid vehicle driveline.

The present description is related to operating a driveline of a hybrid vehicle. The driveline may include an engine, motor, and a torque converter. The hybrid vehicle may include an engine as is shown in FIG. 1. The engine of FIG. 1 may be included in a driveline as is shown in FIG. 2. The system of FIGS. 1 and 2 may provide the operating sequence of FIGS. 3A and 3B. The method of FIG. 4 may be included in the system of FIGS. 1 and 2 to provide the operating sequence of FIGS. 3A and 3B.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240 also known as a motor/generator. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

The system of FIGS. 1 and 2 provides for a system, comprising: an engine; a motor/generator; a motor/generator controller in electrical communication with the motor/generator; a disconnect clutch positioned in a powertrain between the engine and the motor; a transmission including a torque converter lockup clutch, the transmission coupled to the motor/generator; and a vehicle system controller including executable instructions stored in non-transitory memory to unlock the torque converter clutch based on a first schedule in response to the motor/generator being available to supply negative powertrain torque and release of an accelerator pedal, and additional executable instructions to unlock the torque converter clutch based on a second schedule in response to the motor/generator being unavailable to supply negative powertrain torque and release of an accelerator pedal.

In some examples, the system further comprises additional instructions to provide a negative torque to the transmission via the engine in response to the motor/generator being unavailable to supply negative powertrain torque and release of the accelerator pedal. The system further comprises additional instructions to open the disconnect clutch in response to the motor/generator being available to supply negative powertrain torque and the release of the accelerator pedal. The system further comprises additional instructions to open the torque converter clutch based on a third schedule. The system includes where the third schedule opens the torque converter clutch in response to a request to engage gears having a ratio greater than a threshold. The system includes where the ratio greater than the threshold is greater than 2.5:1. The system further comprises additional instructions to enter the engine into a deceleration fuel shut off mode when the motor/generator is unavailable to supply the negative powertrain torque.

Figure 3A:
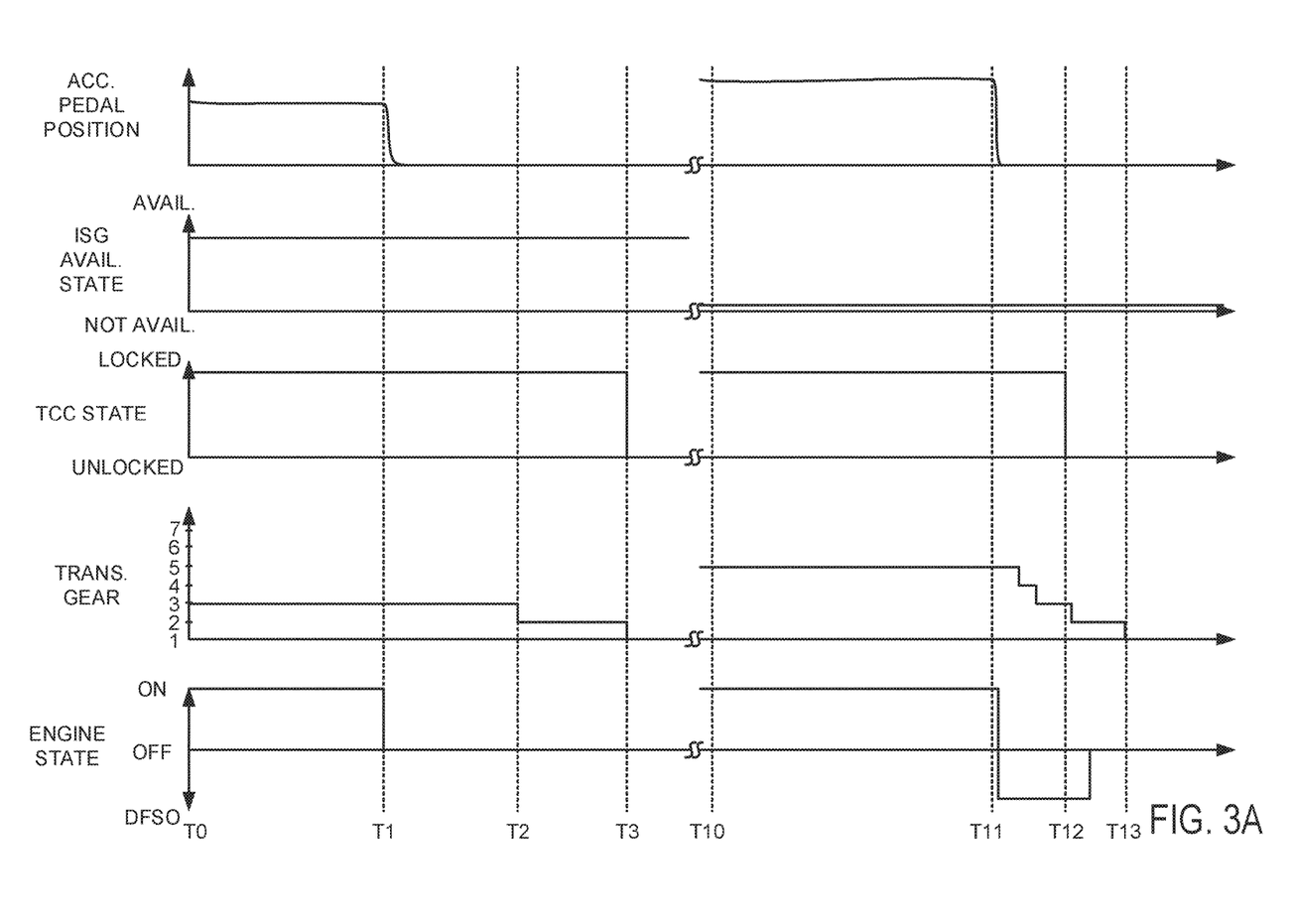
FIG. 3A shows an example driveline operating sequence according to the method of FIG. 4.
Figure 3B:
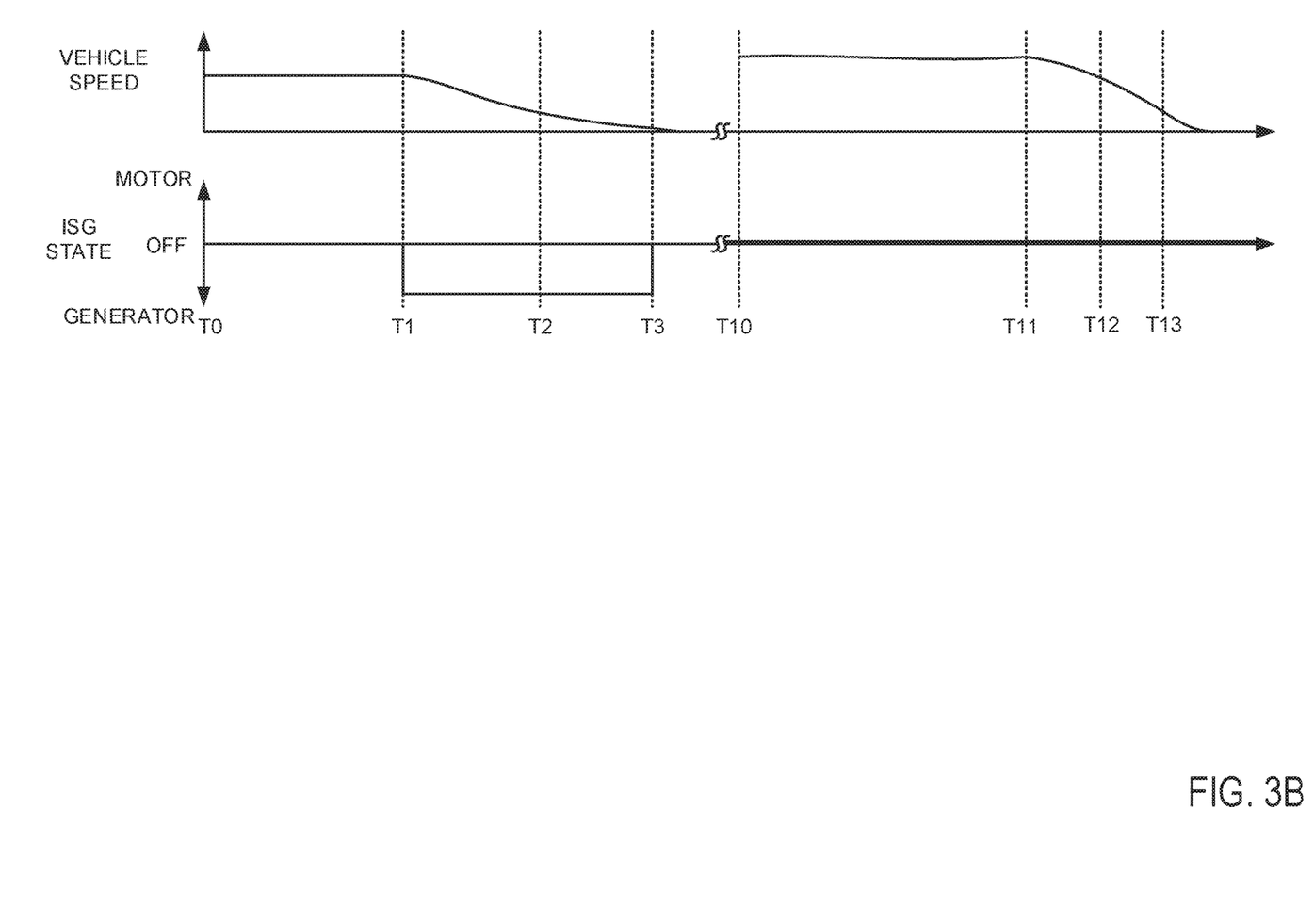
FIG. 3B is part of the driveline operating sequence illustrated in FIG. 3A.

Referring now to FIGS. 3A and 3B, example plots of a vehicle operating sequence are shown. The operating sequence may be performed via the system of FIGS. 1 and 2 in cooperation with the method of FIG. 4. Vertical lines at times T0-T13 represent times of interest during the sequence. The plots in FIGS. 3A and 3B are time aligned and occur at the same time. The SSs along the horizontal axes represent breaks in time for the sequence.

The first plot from the top of FIG. 3A is a plot of accelerator pedal position versus time. The vertical axis represents accelerator pedal position and accelerator pedal position increases in the direction of the vertical axis arrow. The horizontal axis represents time and time increases from the left side of the figure to the right side of the figure. The accelerator pedal position may be converted into a drive demand torque via a transfer function. Accelerator pedal position and vehicle speed are inputs to the transfer function and the transfer function outputs a driver demand torque at the vehicle wheels or at another position along the length of the driveline (e.g., at the transmission input shaft).

The second plot from the top of FIG. 3A is a plot of the ISG availability state versus time. The ISG is available to provide a negative torque to the driveline when the trace is near the vertical axis arrow head. The ISG is not available to supply a negative torque to the driveline when the trace is near the horizontal axis. The horizontal axis represents time and time increases from the left side of the figure to the right side of the figure. The vertical axis represents ISG torque and ISG torque increases in the direction of the vertical axis arrow. The horizontal axis represents time and time increases from the left side of the figure to the right side of the figure.

The third plot from the top of FIG. 3A is a plot of torque converter clutch (TCC) operating state versus time. The TCC is locked when the trace is near the vertical axis arrow head. The TCC is unlocked when the trace is near the horizontal axis. The horizontal axis represents time and time increases from the left side of the figure to the right side of the figure.

The fourth plot from the top of FIG. 3A is a plot of engaged transmission gear versus time. The vertical axis represents engaged transmission gear and the engaged transmission gears are identified alone the vertical axis. The horizontal axis represents time and time increases from the left side of the figure to the right side of the figure.

The fifth plot from the top of FIG. 3A is a plot of engine operating state versus time. The vertical axis represents engine operating state. The engine is operating and combusting air and fuel when the trace is near the vertical axis arrow. The engine is off and not rotating when the trace is at the horizontal axis. The engine is in deceleration fuel cut off when the trace is below the horizontal axis. In deceleration fuel cut off mode, the engine rotates but does not combust air and fuel. The horizontal axis represents time and time increases from the left side of the figure to the right side of the figure.

The first plot from the top of FIG. 3B is a plot of vehicle speed versus time. The vertical axis represents vehicle speed and vehicle speed increases in the direction of the vertical axis arrow. The horizontal axis represents time and time increases from the left side of the figure to the right side of the figure.

The second plot from the top of FIG. 3B is a plot of the ISG state versus time. The ISG is operating as a motor when the trace is near the vertical axis arrow head next to the motor label. The ISG is operating as a generator when the trace is near the vertical axis arrow head next to the generator label. The ISG is not operating when the trace is near the horizontal axis.

At time T0, the accelerator pedal is applied to a middle level and the ISG is available to supply negative torque to the driveline. The accelerator pedal position may be converted into a driver demand torque. The driver demand torque may be a requested torque at a location along the length of the driveline (e.g., a wheel torque or transmission input shaft torque). The accelerator pedal position may be converted to a driver demand torque via inputting accelerator pedal position and vehicle speed into a lookup table. The lookup table outputs a driver demand torque for a location along the length of the driveline.

The ISG may not be available to provide a negative torque to the driveline during a variety of conditions. For example, the motor/generator may not be available when battery state of charge is greater than a threshold. Further, the ISG may not be available when ISG temperature is greater than a threshold. Additionally, the ISG may not be available when battery temperature is greater than a threshold.

The torque converter lockup clutch (TCC) is also locked at time T0 and the vehicle's transmission is engaged in third gear. The engine is on and combusting air and fuel. The ISG is off and the vehicle speed is at a middle level.

At time T1, the driver fully releases the accelerator pedal and the ISG is still available to provide a negative torque to the driveline. The TCC remains locked so that the vehicle's kinetic energy may be transferred from the vehicle's wheels to the ISG, which converts the kinetic energy into electricity when the ISG is operating as a generator. The ISG begins operating as a generator and electricity produced via the ISG is stored in a battery or electric storage device. The ISG applies a negative torque to the driveline when the ISG operates as a generator. Consequently, vehicle speed is reduced via the ISG. The transmission is engaged in a lower gear. Specifically, the transmission is engaged in third gear and the engine is stopped rotating via opening a driveline disconnect clutch (not shown) and ceasing to supply fuel to the engine.

Since the ISG is available to provide a negative torque to the driveline at time T1, at least a portion of the vehicle's kinetic energy is stored as electric charge for later use. The locked TCC permits wheel torque to be transmitted to the ISG through the torque converter. Further, the negative torque supplied by the ISG to the driveline is variable so that the ISG torque may be adjusted allowing the vehicle to follow a desired deceleration trajectory even when in the transmission is engaged in lower gears (e.g., gears 1-3) where providing negative torque solely via the engine may cause vehicle deceleration greater than is desired.

At time T2, the vehicle's transmission downshifts from third gear to second gear while the TCC remains locked and while the ISG remains available to provide a negative torque to the driveline. The ISG operates as a generator applying a negative torque to the driveline so that the vehicle speed continues to decline. The engine remains stopped and the accelerator pedal is not applied.

At time T3, the vehicle's transmission downshifts from second gear to first gear. The TCC unlocks in anticipation of an expected increase in requested driveline torque to accelerate the vehicle. The ISG is turned off and the engine remains stopped to conserve energy. The accelerator pedal is not applied and the vehicle speed approaches zero speed.

The transmission gears may be shifted according to a unique deceleration mode shift schedule for providing torque to the driveline when the ISG is the sole torque source included in the driveline that is applying torque to the driveline. The unique deceleration mode transmission gear shift schedule may downshift the transmission to the various gears at different vehicle speeds as compared to a shift schedule that downshifts the transmission when the engine is providing torque to the driveline during deceleration brought about by driver demand torque being less than a threshold. In this way, the driveline's transmission and ISG may be operated to convert the vehicle's kinetic energy into electrical energy to improve vehicle efficiency when the ISG is available to provide a negative torque to the driveline.

At time T10, a second driveline operating sequence begins after a break in time. The accelerator pedal is applied at a higher level and the ISG is not available to provide a negative torque to the driveline. The TCC is locked and the transmission is engaged in fifth gear. The engine is operating combusting air and fuel while the vehicle travels at a middle level speed. The ISG is off while the vehicle is traveling.

At time T11, the driver fully releases the accelerator pedal at a time when the ISG is still not available to provide a negative torque to the driveline. The engine is combusting air and fuel and the transmission remains in fifth gear (e.g., a middle gear). The TCC remains locked so that the vehicle's kinetic energy may be transferred from the vehicle's wheels to the engine, which keeps the engine speed elevated even though engine torque is reduced in response to accelerator pedal position. The ISG is not operating and the vehicle speed begins to lower in response to the reduced accelerator pedal position.

Between time T11 and time T12, the engine enters deceleration fuel shut off (DFSO) where fuel delivery to engine cylinders ceases in response to releasing the accelerator pedal. The TCC remains locked so that the engine spins at a speed that is a gear ratio multiple of vehicle speed. The ISG remains unavailable to provide negative torque to the driveline and off while the vehicle speed continues to decrease.

At time T12, the TCC unlocks before the transmission is downshifted to second gear (e.g., a lower gear). Unlocking the TCC allows the transmission to shift with less vehicle deceleration since the open torque converter allows the engine to rotate at a speed different than a multiple of the wheel speed. Further, the open torque converter dampens torque flow between the engine and the vehicle wheels to reduce vehicle deceleration as compared to if the TCC were locked closed. The engine continues in DFSO while the ISG is off and unavailable to provide negative torque to the driveline.

Between time T12 and time T13, the transmission downshifts into second gear, but since the TCC is open, vehicle deceleration is reduced as compared to if the TCC were locked. The engine also stops rotating since the engine is not fueled and the TCC is unlocked. The ISG remains unavailable to supply negative torque to the driveline and vehicle speed continues to decrease.

At time T13, the transmission downshifts to first gear. The TCC remains unlocked and the ISG remains unavailable to provide negative torque to the driveline. The vehicle continues to decelerate and the ISG remains off. Shortly after time T13, the vehicle speed reaches zero.

In this way, scheduling of TCC unlocking and transmission gear shifting may be based on whether or not the ISG is available to provide negative torque to the driveline. Further, the engine operating state and driveline disconnect clutch operation may be based on whether or not the ISG is available to provide a negative torque to the driveline.

Figure 4:
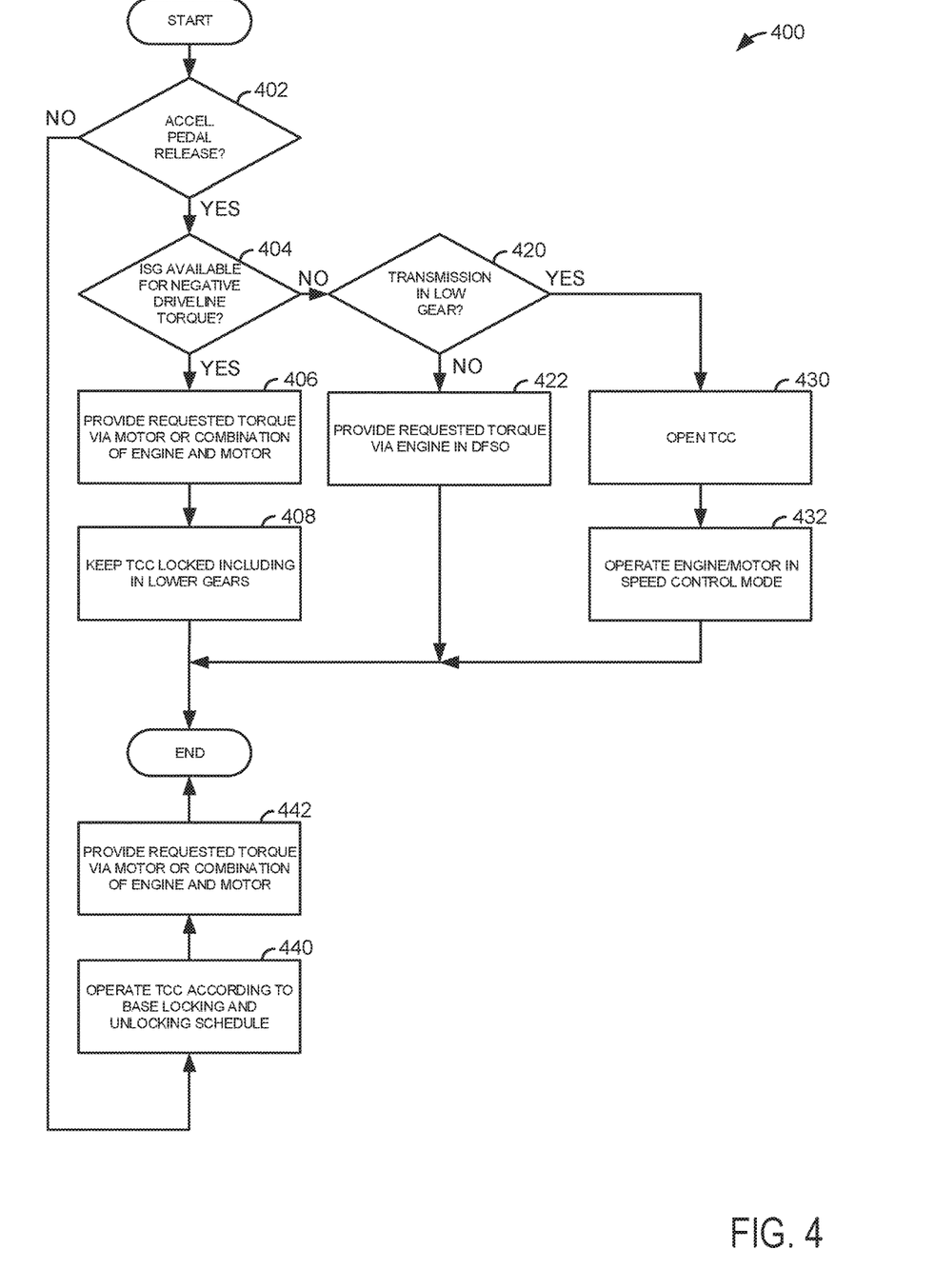
FIG. 4 is an example method for operating a driveline of a hybrid vehicle.

Referring now to FIG. 4, an example flow chart for a method for operating a hybrid vehicle driveline is shown. The method of FIG. 4 may be incorporated and may operate in cooperation with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 judges if the accelerator pedal is released or is being released. Method 400 may judge that the accelerator pedal is released if the accelerator pedal is partially released or fully released. For example, method 400 may judge that the accelerator pedal is released if the accelerator pedal moves from 100% applied (e.g., the accelerator pedal fully depressed) to 10% applied (e.g., 10% of full scale). Method 400 may judge that the accelerator pedal is released based on output of the accelerator pedal position sensor. If method 400 judges that the accelerator pedal is released, the answer is yes and method 400 proceeds to 404. Otherwise, the answer is no and method 400 proceeds to 440.

Further, in some examples, method 400 may also require that the driver demand torque as determined from accelerator pedal position is less than a threshold to proceed to 404. The driver demand torque may be based empirically determined output of a table indexed via accelerator pedal position and vehicle speed.

At 404, method 400 judges if the ISG is available to provide negative torque to the driveline. In one example, the ISG may be determined not to be available to provide negative torque to the driveline if a temperature of the ISG is greater than a threshold. Further, the ISG may not be available to provide negative torque to the driveline if a temperature of the vehicle's battery is greater than a threshold. Further still, the ISG may not be available to provide negative torque to the driveline if the vehicle's battery state of charge is greater than a threshold. If method 400 judges that the ISG is available to provide negative torque to the driveline, the answer is yes and method 400 proceeds to 406. Otherwise, the answer is no and method 400 proceeds to 420.

At 406, method 400 provides a requested torque via driveline torque devices. In one example, the requested torque may be provided by the ISG, the ISG and the engine, or only the engine. The requested torque may be a sum of torques. For example, the requested torque may be a sum of driver demand torque, a driveline braking torque, and creep torque. The driver demand torque may be determined via indexing a table of empirically determined torque values based on accelerator pedal position and vehicle speed. The creep torque is a positive torque value that propels the vehicle at a low speed (e.g., 3 km/hr) when driver demand torque is zero and the vehicle's transmission is in first gear. Driveline braking torque is a negative torque that slows the vehicle at a desired deceleration rate when driver demand is zero and the vehicle is in a gear higher than first gear. The engine and/or motor provide the request torque to the driveline based on operating conditions. Further, a driveline disconnect clutch may be opened and closed in response to vehicle operating conditions to conserve fuel and allow engine torque to be provided to the vehicle wheels. Method 400 proceeds to 408 after providing the desired torque to the driveline via the engine and/or the motor.

At 408, method 400 operates the TCC according to a second TCC schedule. In one example, the second TCC schedule at least partially closes the TCC at vehicle speeds above a threshold speed (e.g., 8 km/hr) and opens a closed TCC (e.g., no torque transfer across the TCC) when vehicle speed is zero or within a threshold of zero (e.g., 5 km/hr) and the transmission is engaged in first gear. The TCC is at least partially closed in lower gears such as gears 1-3 at vehicle speeds greater than a threshold when the accelerator pedal is released. In some examples, the TCC is closed and locked. The TCC is closed and locked when a speed difference between the torque converter turbine speed and torque converter impeller speed is less than a threshold (e.g., 20 RPM). In some examples, the TCC may partially close without locking so that torque is transferred across the torque converter clutch; however, the speed difference between the torque converter impeller and the torque converter turbine is greater than the threshold (e.g., greater than 200 RPM). Closing but not locking the TCC may reduce driveline vibration yet allow engine braking of the driveline. Method 400 proceeds to exit after the TCC is operated according to the second TCC schedule.

In addition at 408, the transmission may be shifted according to a second shift schedule. The second gear shift schedule may shift transmission gears according to ISG charge producing efficiency such that the ISG operates in a speed range where more charge may be produced as compared to other ISG speeds. Further, the driveline disconnect clutch may be opened and engine rotation may be stopped via ceasing to supply fuel to the engine when the ISG is available to supply negative torque to the driveline to conserve engine fuel.

At 440, method 400 operates the TCC according to a first or base TCC schedule. In one example, the first TCC schedule closes the TCC at vehicle speeds above a threshold speed (e.g., 45 km/hr) and opens a closed TCC during transmission shifting and in lower gears (e.g., gears 1-3) when vehicle speed is less than a threshold (e.g., 20 km/hr). Further, the TCC may be partially closed or opened during some conditions to control torque flow through the torque converter. Method 400 proceeds to 442 after the TCC is operated according to the first or base TCC schedule.

In addition at 440, the transmission may be shifted according to a first shift schedule. The first gear shift schedule may shift transmission gears according to ISG torque producing efficiency such that the ISG operates in a speed range where more torque may be produced as compared to other ISG speeds.

At 442, method 400 provides a requested torque via driveline torque devices. In one example, the requested torque may be provided by the ISG, the ISG and the engine, or only the engine. The requested torque may be a sum of torques. For example, the requested torque may be provided as described at 406. Method 400 proceeds to exit after providing the desired torque to the driveline via the engine and/or the motor.

At 420, method 400 judges if the transmission is engaged in a low gear or requested to enter a low gear. In one example, lower gears are gears with gear ratios greater than a threshold gear ratio. For example, lower gears (e.g., $1^{st}$ to $3^{rd}$ gears) may be gears with gear ratios greater than or higher than 1.28:1 (e.g., 2.98:1) and high gears (e.g., $4^{th}$ to $10^{th}$) may be gears with gear ratios less than or lower than 1.28:1 (e.g., 1:1). If method 400 judges that the transmission is engaged in a lower gear or requested to enter a low gear, the answer is yes and method 400 proceeds to 430. Otherwise, the answer is no and method 400 proceeds to 422.

Note that method 400 may open the TCC before shifting into the requested lower gear so as to avoid driveline vibration. However, in higher transmission gears, the TCC may remain locked.

At 422, method 400 provides the requested torque via the engine operation in DFSO mode. By ceasing combustion in one or more engine cylinders via ceasing fuel flow to one or more cylinders, engine pumping work may provide a negative driveline torque. Further, engine valve timing may be adjusted to increase or decrease engine pumping work to increase or decrease driveline braking torque. Further, the TCC remains in a locked state or the TCC is locked so that the engine is directly coupled to the vehicle wheels via the transmission. The driveline disconnect clutch is also closed or remains closed. Method 400 proceeds to exit after the requested driveline torque is provided by the engine.

In addition at 422, the transmission may be shifted according to a third shift schedule. The third gear shift schedule may shift transmission gears according to engine vibration such that the transmission shifts gears to avoid engine resonance modes (e.g., engine speeds less than 600 RPM). Further, the TCC remains in a closed locked state when lower transmission gears are not engaged or requested.

At 430, method 400 opens the TCC. By opening the TCC, the vehicle does not decelerate at a greater rate than is desired in lower gears (e.g., $1^{st}$ to $3^{rd}$ gears). In some examples, the TCC may be partially opened so that at least some torque transfers across the TCC so that the engine may remain rotating in case engine starting is requested. Thus, the TCC may be operated according to a third TCC schedule. In the third TCC schedule, the TCC is at least partially opened in lower gears and closed and locked in higher gears.

Further, at least partially opening the TCC allows the engine to rotate at a speed different than a speed of the transmission input shaft so that engine speed may be maintained at or above a desired engine idle speed. In some examples, the TCC may be fully opened so that no torque is transferred via the TCC. Method 400 proceeds to 432.

At 432, method 400 operates the engine or ISG in a speed control mode. In speed control mode, speed of the ISG or engine is maintained at a desired speed while ISG and engine torque may vary to maintain ISG or engine speed. In one example, the engine speed is maintained at a desired idle speed. If the engine is disconnected from the ISG, the ISG may be operated down to zero speed with the vehicle wheels. Method 400 proceeds to exit after the engine or ISG are operated in speed control mode.

In this way, the TCC may be locked and unlocked according to whether or not the ISG is available to provide a negative torque to the driveline and whether or not the transmission is in a low gear. Further, the engine may enter DFSO mode in response to the ISG not being available to provide a negative torque to the driveline so that negative torque may be provided by the engine.

Thus, the method of FIG. 4 provides for a powertrain operating method, comprising: providing a negative input torque to a transmission via a motor in response to the motor being available to supply the negative input torque and driver demand torque less than a threshold; and providing the negative input torque to the transmission via an engine operating in a deceleration fuel cut off mode in response to the motor being unavailable to supply the negative input torque and the driver demand torque less than the threshold. The method includes where the motor is unavailable when a state of charge of a battery in electrical communication with the motor is greater than a threshold.

In some examples, the method includes where the motor is unavailable when a temperature of the motor is greater than a threshold. The method includes where the motor is unavailable when a temperature of the battery is greater than a threshold. The method further comprises opening a torque converter clutch in response to a request to enter a gear having a ratio greater than a threshold and the motor being unavailable. The method includes where the deceleration fuel cut off mode includes ceasing to supply fuel to engine cylinders and rotating the engine.

The method of FIG. 4 also provides for a powertrain operating method, comprising: opening a torque converter clutch according to a first schedule in response to the motor being available to supply the negative powertrain torque and driver demand torque being less than a threshold; and opening the torque converter clutch according to a second schedule in response to the motor being unavailable to supply the negative powertrain torque and the driver demand torque being less than the threshold.

In some examples, the method includes where the first schedule opens the torque converter clutch in first gear in response to vehicle speed less than a threshold. The method also includes where the second schedule opens the torque converter clutch in response to a request to engage a gear with a ratio greater than a threshold. The method includes where the first schedule opens the torque converter clutch in lower transmission gears than the second schedule. The method further comprises providing a requested driveline torque via the motor and an engine when the motor is available and driver demand torque is less than the threshold. The method further comprises providing a requested driveline torque that provides driveline braking solely via an engine in response to the motor being unavailable and the driver demand torque being less than the threshold. The method further comprises opening the torque converter clutch in response to third schedule in response to an accelerator pedal not being released.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers. This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
providing a negative input torque to a transmission via a motor in response to the motor being available to supply the negative input torque and driver demand torque less than a threshold;
providing the negative input torque to the transmission via an engine operating in a deceleration fuel cut off mode in response to the motor being unavailable to supply the negative input torque and the driver demand torque less than the threshold; and
opening a torque converter clutch in response to a request to enter a gear having a ratio greater than a threshold and the motor being unavailable to supply the negative input torque.

2. The method of claim 1, where the motor is unavailable to supply the negative input torque when a state of charge of a battery in electrical communication with the motor is greater than a threshold.

3. The method of claim 2, where the motor is unavailable to supply the negative input torque when a temperature of the motor is greater than a threshold.

4. The method of claim 2, where the motor is unavailable to supply the negative input torque when a temperature of the battery is greater than a threshold.

5. The method of claim 1, where the deceleration fuel cut off mode includes ceasing to supply fuel to engine cylinders and rotating the engine.

6. The method of claim 1, further comprising:
opening the torque converter clutch according to a first schedule in response to the motor being available to supply the negative input torque and the driver demand torque being less than the threshold; and
opening the torque converter clutch according to a second schedule in response to the motor being unavailable to supply the negative input torque and the driver demand torque being less than the threshold.

7. The method of claim 6, where the first schedule opens the torque converter clutch in first gear in response to vehicle speed less than a threshold.

8. The method of claim 7, where the second schedule opens the torque converter clutch in response to the request to engage the gear with the ratio greater than the threshold.

9. The method of claim 6, further comprising providing a requested driveline torque via the motor and the engine when the motor is available to supply the negative input torque and the driver demand torque is less than the threshold.

* * * * *